No. 784,221. PATENTED MAR. 7, 1905.
J. G. MOLE.
GRINDING MILL.
APPLICATION FILED DEC. 30, 1901.

5 SHEETS—SHEET 1.

WITNESSES: INVENTOR.

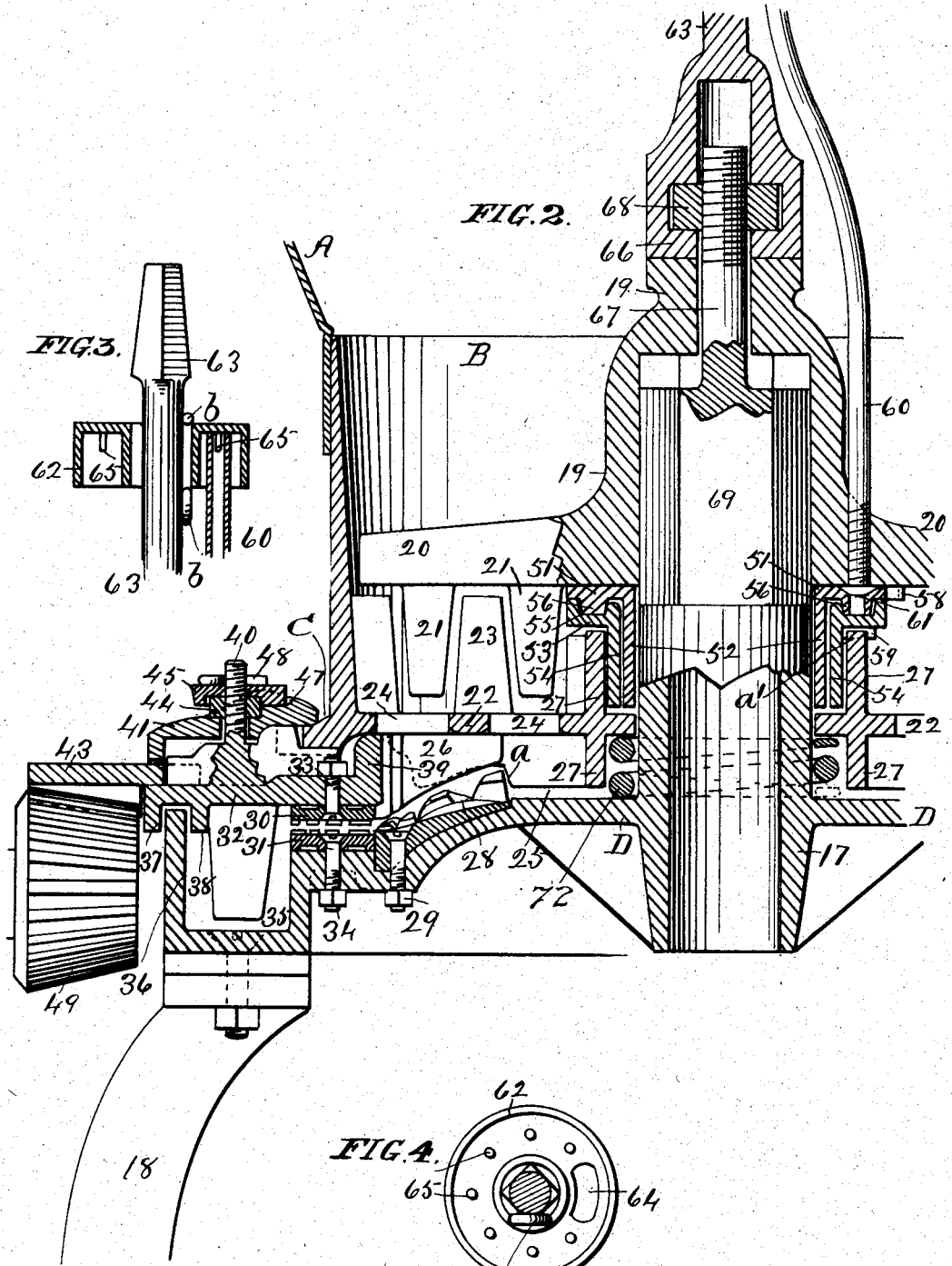

No. 784,221. PATENTED MAR. 7, 1905.
J. G. MOLE.
GRINDING MILL.
APPLICATION FILED DEC. 30, 1901.

5 SHEETS—SHEET 3.

WITNESSES:
F. B. Townsend
J. R. Donalson

INVENTOR.
J. G. Mole.
BY L. B. Coupland & Co
ATTORNEYS.

No. 784,221. PATENTED MAR. 7, 1905.
J. G. MOLE.
GRINDING MILL.
APPLICATION FILED DEC. 30, 1901.
5 SHEETS—SHEET 4.
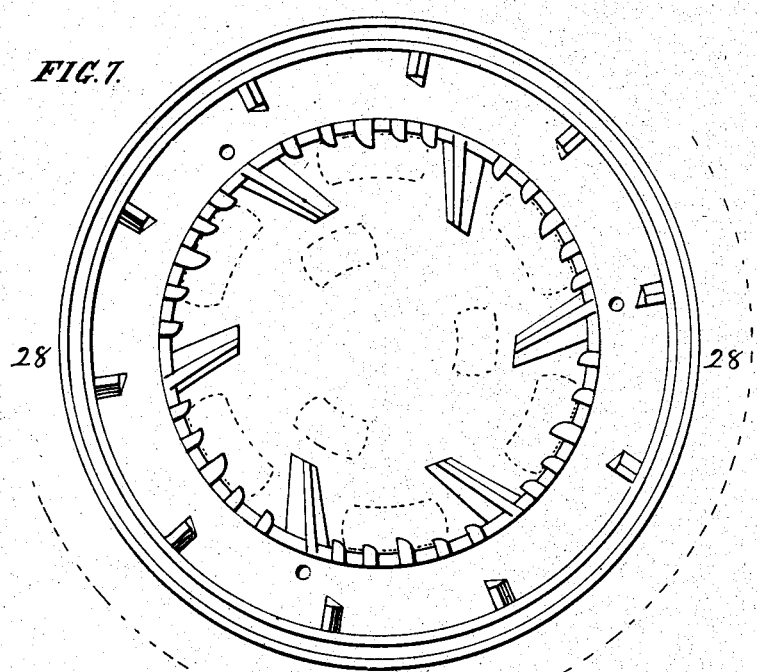
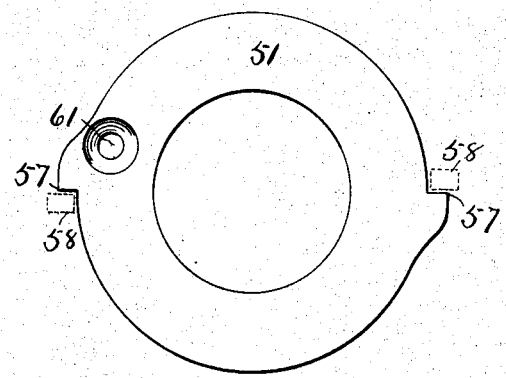
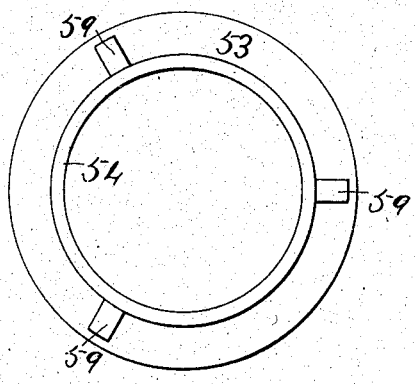
WITNESSES:
F. B. Townsend
J. G. Donalson
INVENTOR
J. G. Mole.
BY L. B. Coupland &Co
ATTORNEYS No. 784,221. PATENTED MAR. 7, 1905.
J. G. MOLE.
GRINDING MILL.
APPLICATION FILED DEC. 30, 1901.
5 SHEETS—SHEET 5.
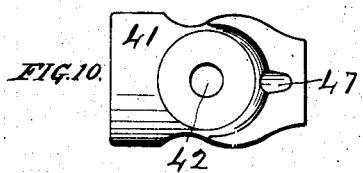
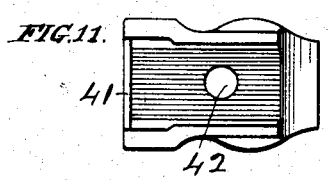
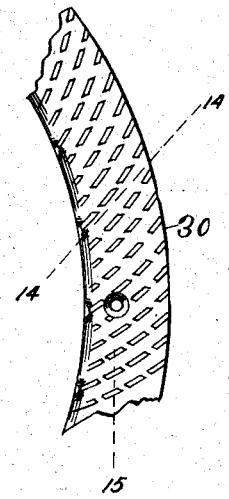
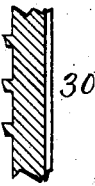
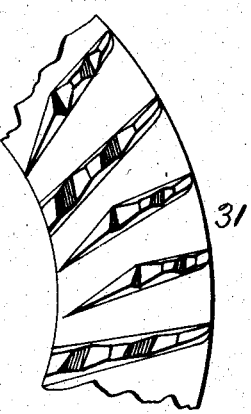
WITNESSES:
F. B. Townsend
J. P. Donalson
INVENTOR.
J. G. Mole.
BY G. B. Coupland & Co
ATTORNEYS.

No. 784,221.  
Patented March 7, 1905.

UNITED STATES PATENT OFFICE.

JOHN G. MOLE, OF BATAVIA, ILLINOIS.

GRINDING-MILL.

SPECIFICATION forming part of Letters Patent No. 784,221, dated March 7, 1905.

Application filed December 30, 1901. Serial No. 87,802.

*To all whom it may concern:*

Be it known that I, JOHN G. MOLE, a citizen of the United States, residing at Batavia, in the county of Kane and State of Illinois, have invented certain new and useful Improvements in Grinding-Mills; and I do hereby declare the following to be a full, clear, and exact description of the invention, such as will enable others skilled in the art to which it appertains to make and use the same.

This invention relates to improvements in portable grinding-mills, and has for its object to provide a device of this character in which the different working parts are of an improved construction and arrangement that will greatly facilitate the operation of grinding, as will be hereinafter set forth.

Figure 1:
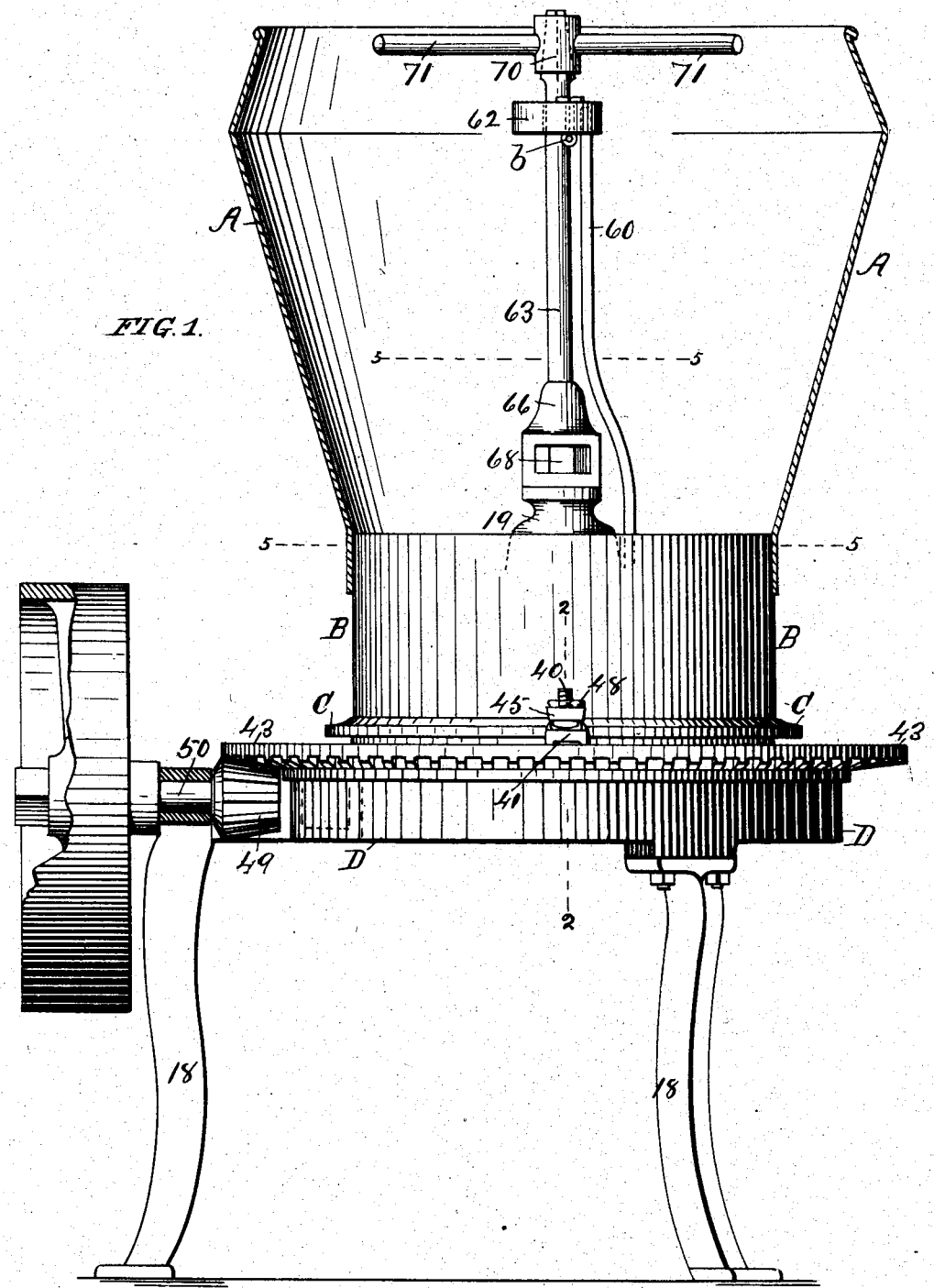
Figure 5:
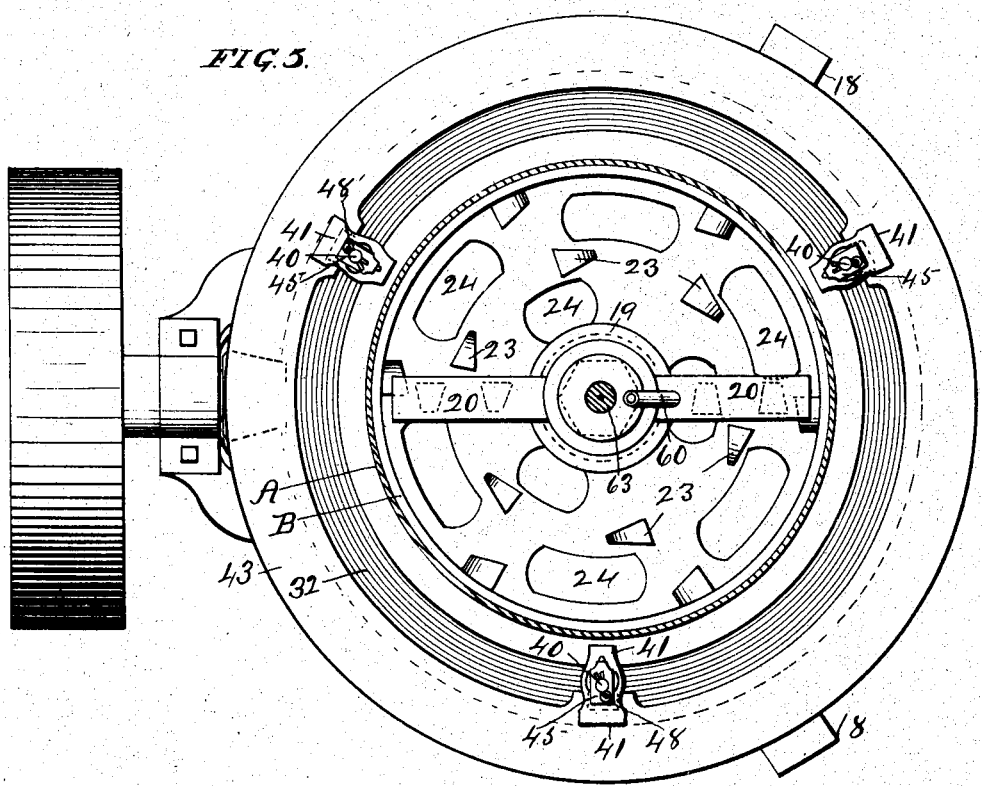
Figure 6:
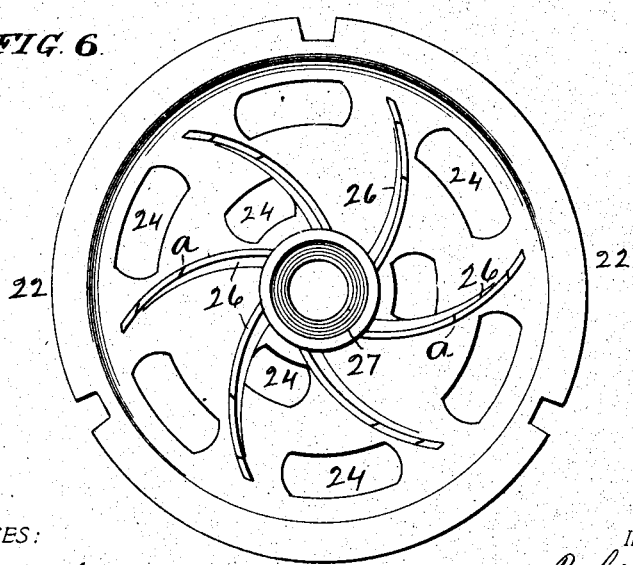

In the drawings, Figure 1 is an elevation and part section of a device embodying the improved features. Fig. 2 is a broken-away vertical section on line 2, Fig. 1. Fig. 3 is a detached sectional detail of construction. Fig. 4 is a plan detail of the cap and parts shown in Fig. 3. Fig. 5 is a horizontal plan section on line 5, Fig. 1, looking downward. Fig. 6 is a plan of the under side of a revoluble diaphragm, a top plan of which is shown in Fig. 5. Fig. 7 is a plan of a coarse breaking-ring located below the revoluble diaphragm. Fig. 8 is a plan of a mill bearing-ring. Fig. 9 is a bottom plan of a companion bearing-ring. Figs. 10, 11, and 12 are details of a clamping or locking device. Fig. 13 is a broken-away part of the upper or runner grinding-ring. Fig. 14 is a section on line 14, Fig. 13. Fig. 15 is a section on line 15, Fig. 13; and Fig. 16 is a part of the lower or stationary companion ring, showing the grinding-surface.

A hopper A is rigidly mounted on a casing B and is revoluble therewith. The casing B is provided on its lower end with an annular flange C.

D represents the stationary base of the mill structure, the hub 17 forming an integral part thereof, supported on legs 18, as shown in Figs. 1 and 2. A cap 19 is located above and in line with the hub part 17 and is provided with lateral projecting breaker-arms 20, armed with breaker-teeth 21, extending downward from the under side thereof and which stop short of a diaphragm 22, rigidly secured in place and rotating with the mill-casing. This diaphragm is provided on its upper side with a number of coarse breaker-teeth 23, set concentrically with reference to the teeth on the breaker-arms, so as to clear the same when the diaphragm is in motion, as shown in Fig. 2, the relative position of the teeth on arms 20 being also indicated by dotted lines in Fig. 5. The object of this coarse-toothed mechanism is to first break the corn, cob and all, when it is to be ground up for feed. The diaphragm is also provided with a number of openings 24, through which the substance being ground passes into the chamber or space 25 thereunder.

The diaphragm is provided on the under side, Fig. 6, with a number of radially-disposed arms 26, extending outward from the hub part 27 and stopping short of the edge of the diaphragm. The edges of these arms are of the contour shown in Fig. 2—that is, cut away to form a shoulder or offset $a$, which drops below the inner highest edge and presents a concave surface to the inclined supplemental coarse reducing-ring 28, Figs. 2 and 7, which is recessed in the bottom part of the mill and rigidly secured in place by a number of bolts 29. This ring, in connection with the radial arms 26 on the diaphragm, still further reduces the product preparatory to its passing to the grinding-rings 30 and 31. The radial arms are somewhat curved and have a sweeping action from the center outward and gradually distribute the product to the grinding-rings proper in maintaining a uniform feed. It will be understood that the cap 19 and the breaker-arms 20, carried thereby, do not rotate with the revoluble parts, but remain stationary.

The revoluble parts comprise the hopper A, the casing B, the diaphragm 22, the gear-wheel 43, the driving-pinion 49, engaging therewith, and the bearing-ring 53. These parts are all secured together and are supported on a spring 72, which may be compressed more or less by means of a manually-operated stem 63, having a threaded nut 68 chambered therein and which is engaged by a threaded bolt 67, headed in a part 69, that is a continuation of the hub 17.

The upper grinding-ring or runner 30 is rigidly secured to a carrying-ring 32 by a number of bolts 33, as shown in Fig. 2. The stationary grinding-ring 31 is secured to the stationary base-casting by a number of bolts 34. From the edge of the grinding-rings outward the contour of the bottom casting is such as to inclose an annular chamber 35 and terminates in the vertical rim 36. The product from the grinding-rings passes into the chamber 35 and from thence is spouted away in any suitable manner. The under side of the carrying-ring 32 is provided in its outer edge with flanges 37 and 38, which project downward on each side of and overlap the upper edge of the vertical rim 36, so as to prevent the ground product from escaping in that direction. The inner edge of the carrying-ring 32 is provided with a flange 39, on which the mill-casing rests. The lower ends of a number of screw-threaded bolts 40 are rigidly secured to the carrying-ring 32 and disposed at intervals in the circumference, as best shown in Fig. 5. A clamping-plate 41, Figs. 10 and 11, is provided with an aperture 42 and fits down loosely over the bolt 40, the inner end resting on the rim-flange C, formed on the mill-casing, and the outer end bearing on the inner upper side of a ring-driving gear-wheel 43. Fig. 10 is a top plan, and Fig. 12 is a bottom plan, of clamping-plate 41. A nut 44 has a threaded engagement with bolt 40 and bears on plate 41. A lock-plate 45, Fig. 12, bottom plan, is provided in the under side with a shallow recess corresponding to the contour of the clamping-nut and sets down over the same. This lock-plate is provided on the inner end and under side with a lip 46, adapted to engage a groove 47 in the clamping-plate 41, and thereby prevent the lock-plate from turning in either direction and locking the clamping-nut against working loose. The upper end of bolt 40 is apertured for the insertion of a split pin 48, which holds the locking-plate down in its engaged position. The inner edge of the gear-wheel 43 has a rigid clamped bearing on the outer top part of the carrying-ring 32, as more clearly shown in Fig. 2. A pinion 49, mounted on a driving-shaft 50, engages the gear-wheel 43 and transmits the required motion to the revoluble mill parts.

The mill-driving bearing consists of a stationary upper ring, Fig. 8, top plan, 51, provided with a sleeve part 52, extending downward and loosely surrounding the stationary hub 17, and a revoluble bottom ring 53, Fig. 9, bottom plan, provided with a sleeve 54, corresponding to sleeve 52 and loosely inclosing the same, as shown in Fig. 2. The horizontal part of the bottom ring 53 is provided with a bearing-groove 55 and the corresponding portion of the upper ring with a shoulder-bearing part 56, loosely seating in said groove. The upper bearing-ring is prevented from turning by stop-shoulders 57 thereon contacting lugs 58 on the under side of the breaker-arms 20, as shown in Fig. 2 and indicated by dotted lines in Fig. 8. The bottom bearing-ring 53 is provided on the under side with a number of ribs 59, disposed at intervals and which are adapted to engage corresponding recesses in the top edge of the hub part 27, the engaged position of one of the ribs 59 being shown in Fig. 2, the recess being indicated by a dotted line, as at $a'$. This rib feature connects the bottom bearing-ring with the other revoluble parts. The journal bearing-surfaces of these rings are lubricated through an oil-tube 60, the lower end of which is inserted in an aperture 61 in the upper bearing-ring. The upper open end of the oil-tube ends in a cap 62, removably mounted on the upper part of an adjusting socket-stem 63. The cap 62 is provided with an aperture 64, Fig. 4, through which the lubricant will pass into the oil-tube when the aperture 64 is in line therewith. The cap 62 may be turned in its position to bring an imperforate part over the open end of the oil-tube and exclude dirt and dust from reaching the journal bearing-surface. The cap 62 is provided with a number of pins 65, inserted in the under side and projecting downward therefrom. These pins are spaced at intervals in a circle and one of them at a time is adapted to engage the open end of the oil-tube when the cap is seated in a closed position, and is thereby prevented from accidentally turning and uncovering the oil-opening. A locking-key $b$, Figs. 3 and 4, loosely inserted between the cap 62 and the stem 63, also assists in preventing the cap from turning around in its seated position.

The lower end of the stem 63 is provided with an enlarged socket part 66, resting loosely on the cap 19. The threaded end of the bolt 67 extends up into the socket part and engages a stationary nut 68, threaded therein. The lower end of bolt 67 is headed in the polygonal part 69. The upper end of stem 63 is square in cross-section and is engaged by a socket-wrench head 70. This wrench is provided with manipulating hand-bars 71, by means of which the stem may be turned in either direction and the bolt 67 moved up or down and compressing spring 72 more or less in adjusting the revoluble parts with reference to the stationary parts.

Having thus described my invention, what I claim, and desire to secure by Letters Patent, is—

1. In a grinding-mill, the combination with a revoluble diaphragm provided on the under side with radial arms presenting a concave reducing edge, of a toothed reducing-ring secured in a stationary position below said arms and presenting a spherical surface to the action of the superposed edges of the radial arms, substantially as set forth.

2. In a grinding-mill, the combination with the stationary bottom part of a supplemental grinding-ring recessed in said bottom part and set at an inclined angle, a perforated revoluble diaphragm provided with radial arms positioned above the grinding-surface of said ring, the grinding-rings proper, located outside of the supplemental ring, and the carrying-ring to which the upper grinding-ring or runner is secured, substantially as set forth.

3. In a grinding-mill, the combination with a revoluble casing, of a stationary base-casting provided with an annular chamber in the outer edge thereof, a supplemental grinding-ring recessed in said base and set at an inclined angle, the companion grinding-rings 30 and 31 means for supporting the ring 30 in its working position, and the driving-rim gear-wheel, substantially as set forth.

4. In a grinding-mill, the combination with a stationary hub, of a stationary upper bearing-ring provided with a sleeve part loosely surrounding said hub, means for locking said ring against a rotary movement, and a revoluble bottom bearing-ring provided with a sleeve loosely inclosing the corresponding part on the upper ring, said rings being retained in their relative bearing position by an annular groove formed in one ring and an engaging annular shoulder formed on the other ring, substantially as set forth.

In testimony whereof I affix my signature in presence of two witnesses.

JOHN G. MOLE.

Witnesses:
J. B. DONALSON,
L. B. COUPLAND.